2,995,533
Patented Aug. 8, 1961

2,995,533
LUBRICANT COATING FOR GLASSWARE
Jess H. Parmer and Earl F. Schaefer, Toledo, Ohio, assignors to Owens-Illinois Glass Company, a corporation of Ohio
No Drawing. Filed June 19, 1957, Ser. No. 666,748
8 Claims. (Cl. 260—23)

The present invention relates to the treatment of surfaces of glassware such as jars, bottles, tumblers and the like, and particularly exterior surfaces which are subjected to abrasive contact with each other as well as attendant manufacturing and/or packaging equipment during handling or shipment.

An object of this invention is to provide a composition adaptable to treatment of surfaces of such glassware to produce thereon a film comprising a durable lubricant of non-injurious character either to the glassware or to contained products and such that when articles contact one another or handling mechanism, marring or injuring the engaging surfaces through abrasion or frictional contact is either entirely prevented or reduced to a minimum.

Another object of this invention is to provide a coating composition adaptable to placing a thin invisible layer over glassware which does not contain constituents likely to adversely affect comestible products or their ultimate consumer.

Newly manufactured bottles, jars and tumblers, for example, can become readily scratched or marred when rubbed against one another with light physical contact in some cases. When conditions during handling or shipment of the glass containers are conducive to producing considerable interaction among such articles, the appearance of exterior surfaces not only becomes objectionable due to mars, scratches or the like, but resistance to breakage is considerably reduced and the value of the glassware correspondingly impaired while breakage losses are increased.

The present invention permits improved life and handling of glassware through the application of a lubricating compound to the surfaces thereof and a consequent reduction in the cost of handling and shipment together with economies based upon reduced breakage. The present invention is based upon the discovery that certain materials which are non-injurious to humans may be applied to the surfaces of glassware in the form of thin films which are fully capable of preventing the scratching of one piece of glass by another as the ware is rubbed or interacted mechanically. Heretofore, materials which have been applied to glassware as film coatings have either been insufficiently durable to withstand repeated washing and leaching, or not sufficiently inert to be adaptable to packaging a wide variety of consumable products without reaction therewith to simultaneously safeguard the product and the consumer. The preferred composition of this invention as set forth hereinafter has been certified as non-objectionable for coating glassware by the Federal Drug Administration.

The lubricants for effectively preventing scratching of glassware must possess other desirable properties than the prevention of abrasion alone. It is necessary that the lubricant be invisible and one which does not react with the glass over long periods of time in a manner that would visibly change the appearance of the glass. Also the lubricant should be such that it is not easily removed from glass of refillable containers subjected to conventional alkali washes such as given to the ware for packaging beer, ale and milk for example, in the beverage industries. It is also highly desirable that the lubricant be water resistant so that the glass surface may be protected against leaching.

We have found that an aqueous emulsion of polyethylene using an emulsifier acceptable to the Federal Drug Administration and in complete compliance with the Food, Drug and Cosmetic Act, may be applied over glassware to protect its surfaces from scratching.

The polyethylene emulsion has been found to be an excellent protective material for coating glass surfaces in reducing abrasion caused by defects due to bottle-to-bottle or metal-to-bottle contact. Some forms of polyethylene emulsions which are available on the market for coating various materials are unacceptable for packaging foods because of the toxicity of the emulsifier. While the emulsifier may be present in only minute amount, particular care must be exercised in its selection to minimize or completely prevent undesirable chemical and physiological effects.

A particular polyethylene material which has been found to be preferred in the preparation of an aqueous emulsion is AC Polyethylene, Product No. 629, distributed by the Semet-Solvay Division of Allied Chemical and Dye Corporation, having chemical and physical properties which readily permit its application in the subject invention. This particular polyethylene is composed of relatively low molecular weight polymers having a molecular weight ranging from approximately 1200 to 1500, although the molecular weight can be as high as about 2000. The designated product is partially oxidized, i.e. having a portion of its unsaturated linkages bound to oxygen atoms, and has an acid number ranging from about 14 to 17. The acid number is a term used in the analysis of waxes and fats to designate the number of milligrams of potassium hydroxide required to neutralize the free fatty acids in one gram of substance. The determination is performed by titrating an alcoholic solution of the material with tenth or half-normal alkali using phenolphthalein as indicator. Polyethylene is an excellent film former and serves as an excellent protective material on glass surfaces to reduce scratching caused by container contact.

An emulsion of polyethylene in order to be useful in spraying glassware for packaging non-food items may be emulsified with a wide range of chemical reagents. However, in the case of glass containers for containing foodstuffs the toxicity of the emulsifier is an important factor which must be controlled. Many emulsifiers have been used to effectively emulsify polyethylene mixtures, but in a considerable number of the cases, the emulsifier had such toxic properties as to cause its disqualification for contacting comestible items. A number of alkali fatty acids are non-toxic, but are only slightly effective as emulsifiers for polyethylene.

Potassium oleate has been found to be an excellent emulsifier of an aqueous emulsion of polyethylene and other alkali metal fatty acids such as oleates, palmitates, stearates and laurates, used either singly or in combination, have similarly been found to be satisfactory emulsifiers.

Utilizing special preparation techniques the alkali metal oleates have been able to produce stable emulsions of polyethylene to provide the subject surface treating material. The material may be sprayed over rows of glassware during their egress from an annealing lehr prior to their being packed.

The proper proportions of the polyethylene-potassium oleate mixture comprising a preferred composition to obtain a satisfactory stable emulsion consists of the following proportions in approximate parts by weight.

| | Parts |
|---|---|
| AC Polyethylene No. 629 | 40 |
| Oleic acid (U.S.P.) | 11 |
| Potassium hydroxide | 2 |
| Distilled water | 207 |

The emulsion is prepared in the following manner:

The polyethylene is first melted and retained in a mixing vessel at a temperature of from 230 to 245° F. The oleic acid is heated to 230° F. in a separate container and then added to the melted polyethylene with thorough mixing.

The potassium hydroxide is dissolved in a portion of the above designated water in still another container with sufficient water to make a 60% by weight solution. After the potassium hydroxide is fully dissolved and the solution still retains a certain amount of heat of reaction, the potassium hydroxide solution is added dropwise to the polyethylene-oleic acid mixture at a controlled rate which is determined by the resulting reactions. Care must be exercised in the addition of the potassium hydroxide solution since the mixture tends to froth and boil violently during the potassium hydroxide addition. During the addition of the potassium hydroxide, the mixture must be stirred rapidly with a properly contoured mixing blade and as a practical matter, one which does not introduce an excessive amount of air into the mixture.

The mixing equipment preferably is composed of stainless steel and the rate of stirring during mixing must be determined by the batch size and container shape. During the potassium hydroxide addition the temperature of the mixture must be controlled at a temperature ranging from 230 to 245° F.

An example of the preparation of a 5 gallon batch of the concentrated polyethylene emulsion consists of the following conditions and equipment for the preparation of an approximate 20% solids emulsion.

The polyethylene may be melted as rapidly as possible without burning or scorching. The heated oleic acid is added when both materials are near the same temperature. The potassium hydroxide solution is added dropwise over a period of approximately 1 hour. The primary mixing container may be comprised of a vessel 14 inches in diameter and 16 inches high with slightly tapered sides and flat bottom constituting a frusto-conical container. Agitation of the mixture may be suitably accomplished with a four-arm propeller blade having a diameter of 6 inches and a 30 degree pitch operating at 725 revolutions per minute. The temperature is controlled through the range of from 230 to 245° F. throughout the mixing operation.

The chemical reactions which are produced as a result of combining these materials in the preceding operation form a concentrated stable emulsion which may subsequently be diluted with water. In dilution the mixture is added to a prescribed amount of distilled water having a temperature of from 200 to 210° F. The mixture is poured into the water very slowly at first and at an increasing rate which permits the mixture to remain at the same temperature of from 200 to 210° F. The water into which the mixture is poured must be stirred in such a manner as to form a large vortex. A translucent blue haze appears upon the first small addition of the polyethylene mixture to the diluent water. This coloration indicates that the particle size of the emulsion is small and that it will remain stable for a considerable length of time.

The particle size of the polyethylene is less than 10 microns and the particles generally have diameters of approximately 1 to 5 microns when the polyethylene mixture is first poured into the water. If a milky white appearance occurs, the emulsion has been found to separate into several phases upon standing probably due to excessive particle size of the polyethylene.

During the time that the polyethylene-oleic acid mixture is added to the water, the same mixing speed is maintained until all of the material is added. The mixing speed is then reduced to approximately one-tenth of the original and this slower stirring is continued at the reduced rate while the emulsion cools down over a period of about 30 minutes.

The emulsion may then be stored at a temperature of about 35° F. and below 120° F. in impervious containers such as glass, stainless steel or polyethylene. The final emulsion should be at pH 7 when prepared in the prescribed manner and will remain stable for extensive periods for subsequent use, even when diluted to the order of about 200 to 1 with distilled water.

In present practice the emulsion is prepared at one location in concentrated form and shipped to various parts of the country where it is then diluted to about one-tenth percent total solids for spraying glass. This concentration is equivalent to about 20 milliliters of concentrated solution per gallon of water.

The diluted solution is sprayed over glassware such as milk bottles, beverage bottles, etc., during their passage from an annealing lehr while at a temperature of about 400° F. Coating temperatures of this order are preferred to secure increased adherence of the polyethylene emulsion. Examination of the coating material has indicated that the emulsifier present in the film-like coating is present in an amount of about 0.2 part per million in the case of potassium oleate emulsifier. The wide range of other emulsifiers set forth above may be employed to emulsify the polyethylene, however, the conditions and equipment described above pertain to the application of this particular emulsifier.

Various modifications may be resorted to within the spirit and scope of the appended claims.

We claim:

1. The method of increasing the abrasion-resistance of surfaces of newly formed articles of glassware such as bottles, jars, tumblers and the like by providing an extremely thin invisible film thereover, said method comprising the steps of melting 40 parts of partially oxidized low-molecular weight polyethylene having a molecular weight of approximately 1200 to 2000 and an acid number of 14 to 17, adding to the the molten polyethylene 11 parts of a fatty acid selected from the group consisting of oleic, palmitic, stearic, lauric, and mixtures thereof, adding 2 parts of an aqueous solution of an alkali metal hydroxide to the molten polyethylene-fatty acid mixture with constant stirring while controlling the temperature of the mixture within the range of from 230° to 245° F., adding said mixture to water to form an emulsion, the total amount of water in said emulsion being 207 parts, the polyethylene in said emulsion having a particle size of less than 10 microns and comprising a solids content of about 20% by weight of the emulsion, diluting said emulsion with water, and spraying the diluted emulsion over glassware at a temperature substantially below the annealing temperature of said glassware to obtain a firm adherence of the emulsified polyethylene particles in film form to said surfaces with elimination of the water component therefrom, all of said parts being by weight.

2. The method of forming a concentrated translucent emulsion of polyethylene particles in water, said polyethylene particles having a size of less than 10 microns, comprising the steps of melting 40 parts of partially oxidized polyethylene having a molecular weight of approximately 1200 to 2000 and an acid number of 14 to 17, maintaining said molten polyethylene at a temperature of about 230° to 245° F., adding thereto and mixing therewith 11 parts of a fatty acid selected from the group consisting of oleic, palmitic, stearic, lauric, and mixtures thereof heated to a temperature of 230° F., adding to the mixture an aqueous solution of 2 parts of alkali metal hydroxide at a controlled rate while constantly stirring said mixture and maintaining the temperature thereof at 230° to 245° F., adding said mixture to water heated to a temperature of from 200° to 210° F. while stirring said water to form an emulsion, the amount of water in said emulsion being 207 parts, and cooling said emulsion, all of said parts being by weight.

3. The concentrated, translucent emulsion of polyethylene particles in water, said polyethylene particles hving a size less than 10 microns, made in accordance with the method defined in claim 2.

4. The method of increasing the abrasion resistance of surfaces of newly-formed articles of glassware, such as bottles, jars, tumblers, and the like, by providing such surfaces with an extremely thin, adherent, invisible film, said method comprising the steps of melting 40 parts of partially oxidized polyethylene having a molecular weight of approximately 1200 to 2000 and an acid number of 14 to 17, maintaining said molten polyethylene at a temperature of about 230° to 245° F., adding thereto and mixing therewith 11 parts of oleic acid heated to a temperature of 230° F., adding to the mixture a 60 percent aqueous solution of 2 parts of potassium hydroxide at a controlled rate while constantly stirring said mixture and maintaining the temperature thereof at from 230° to 245° F., adding said mixture to water heated to a temperature of from 200° to 210° F. while stirring said water to form an emulsion, the amount of water in said emulsion being 207 parts, the polyethylene in said emulsion having a particle size of from 1 to 5 microns, diluting said emulson with water, spraying the diluted emulsion over the surfaces of glassware at a temperature substantially below the annealing temperature of said glassware to obtain a firm adherence of the emulsified polyethylene particles in film form to said surfaces with elimination of the water components therefrom.

5. The method of forming a concentrated translucent emulsion of polyethylene particles in water, said polyethylene particles having a size of less than 10 microns, comprising the steps of melting 40 parts of partially oxidized polyethylene having a molecular weight of approximately 1200 to 2000 and an acid number of 14 to 17, maintaining said molten polyethylene at a temperature of about 230° to 245° F., adding thereto and mixing therewith 11 parts of oleic acid heated to a temperature of 230° F., adding to the mixture a 60 percent aqueous solution of 2 parts of potassium hydroxide at a controlled rate while constantly stirring said mixture and maintaining the temperature thereof at from 230° to 245° F., adding said mixture to water heated to a temperature of from 200° to 210° F. While stirring said water to form an emulsion, the amount of water in said emulsion being 207 parts, and cooling said emulsion.

6. The process as defined in claim 5 wherein said emulsion is further diluted with up to 200 parts water.

7. The method of increasing the abrasion resistance of surfaces of newly-formed articles of glassware such as bottles, jars, tumblers and the like by providing an extremely thin invisible film thereover, said method comprising the steps of melting 40 parts of partially oxidized low-molecular weight polyethylene, said polyethylene having a molecular weight of approximately 1200 to 1500 and an acid number of 14 to 17, adding 11 parts oleic acid to the molten polyethylene then 2 parts of an alkali hydroxide in aqueous solution to the molten polyethylene-oleic acid mixture with constant stirring while controlling the temperature of the emulsion in the range of from 230 to 245° F., adding the formed mixture to water, the total amount of water in the emulsion being 207 parts, the polyethylene in emulsified form having a particle size of less than 10 microns and comprising a solids content of about 20% by weight of the emulsion, diluting the concentrated emulsion with water, and spraying the diluted emulsion over glassware at an elevated temperature of about 400° F. to obtain firm adherence of the emulsified polyethylene particles with elimination of the water component.

8. The method in accordance with claim 7, including the step of diluting the concentrated emulsion of polyethylene with water in the ratio of about 100 to 1 or more and spraying the diluted emulsion in finely atomized form over the heated glassware to deposit an adherent invisible film over contacted glass surfaces.

References Cited in the file of this patent

UNITED STATES PATENTS

| | | |
|---|---|---|
| 2,132,138 | Williams et al. | Oct. 4, 1938 |
| 2,290,794 | Alvarado et al. | July 21, 1942 |
| 2,612,458 | Stedman | Sept. 30, 1952 |
| 2,653,919 | Hunter | Sept. 29, 1953 |
| 2,766,214 | Erchak et al. | Oct. 9, 1956 |

FOREIGN PATENTS

| | | |
|---|---|---|
| 476,476 | Canada | Aug. 28, 1951 |

OTHER REFERENCES

Warth: The Chemstry and Technology of Waxes, pp. 525–530, Reinhold (1956).

Warth: The Chemistry and Technology of Waxes, pp. 447–8, 524–5, 530–4, 571–2, Reinhold (1956).